US012619439B2

(12) United States Patent
LLoyd et al.

(10) Patent No.: US 12,619,439 B2
(45) Date of Patent: May 5, 2026

(54) ESTABLISHING AN INTERNAL CLOCK VALUE OF AN INTERNET-OF-THINGS DEVICE BASED ON A TIMESTAMP RECEIVED FROM A SECURITY SERVICE VIA A SECURE CONNECTION

(71) Applicant: Microsoft Technology Licensing, LLC, Redmond, WA (US)

(72) Inventors: Joseph Alexander LLoyd, Kent, WA (US); Alistair James Lowe, Ipswich (GB); Dennis Yupeng Liang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 133 days.

(21) Appl. No.: 18/525,695

(22) Filed: Nov. 30, 2023

(65) Prior Publication Data

US 2025/0181357 A1 Jun. 5, 2025

(51) Int. Cl.
| | |
|---|---|
| *G06F 9/4401* | (2018.01) |
| *G06F 1/14* | (2006.01) |
| *G06F 21/60* | (2013.01) |
| *H04L 9/08* | (2006.01) |
| *H04L 9/30* | (2006.01) |
| *H04L 9/32* | (2006.01) |
| *H04L 9/40* | (2022.01) |

(52) U.S. Cl.
CPC .............. *G06F 9/4401* (2013.01); *G06F 1/14* (2013.01); *G06F 21/606* (2013.01); *H04L*

*9/088* (2013.01); *H04L 9/30* (2013.01); *H04L 9/3263* (2013.01); *H04L 63/166* (2013.01)

(58) Field of Classification Search
None
See application file for complete search history.

(56) References Cited

U.S. PATENT DOCUMENTS

| | | | | | |
|---|---|---|---|---|---|
| 7,926,096 | B2 * | 4/2011 | Ali | ......................... | H04L 9/3271 |
| | | | | | 713/400 |
| 9,674,303 | B1 * | 6/2017 | Klemin | ............... | H04L 67/1097 |
| 2006/0294593 | A1 * | 12/2006 | Eldar | .................... | G06F 21/725 |
| | | | | | 726/26 |
| 2015/0023203 | A1 * | 1/2015 | Odell | .................. | H04L 43/0852 |
| | | | | | 370/253 |
| 2021/0211271 | A1 * | 7/2021 | Kuang | .................... | H04L 9/065 |

\* cited by examiner

*Primary Examiner* — Kim Huynh
(74) *Attorney, Agent, or Firm* — Wade IP Law PLLC

(57) ABSTRACT

Techniques are described herein that are capable of establishing an internal clock value of an IoT device based at least on a timestamp received from a security service via a secure connection. The IoT device is booted up by setting a time value associated with an internal clock of the IoT device to a default time value. The time value is reset to an updated time value that is received from a trusted time source. A secure connection is established between the IoT device and the security service using the updated time value. A first timestamp is received by the IoT device from the security service via the secure connection. The time value is reset to a second updated time value that is based at least on the first timestamp. An operation that utilizes a second timestamp, which is based at least on the second updated time value, is performed.

20 Claims, 6 Drawing Sheets

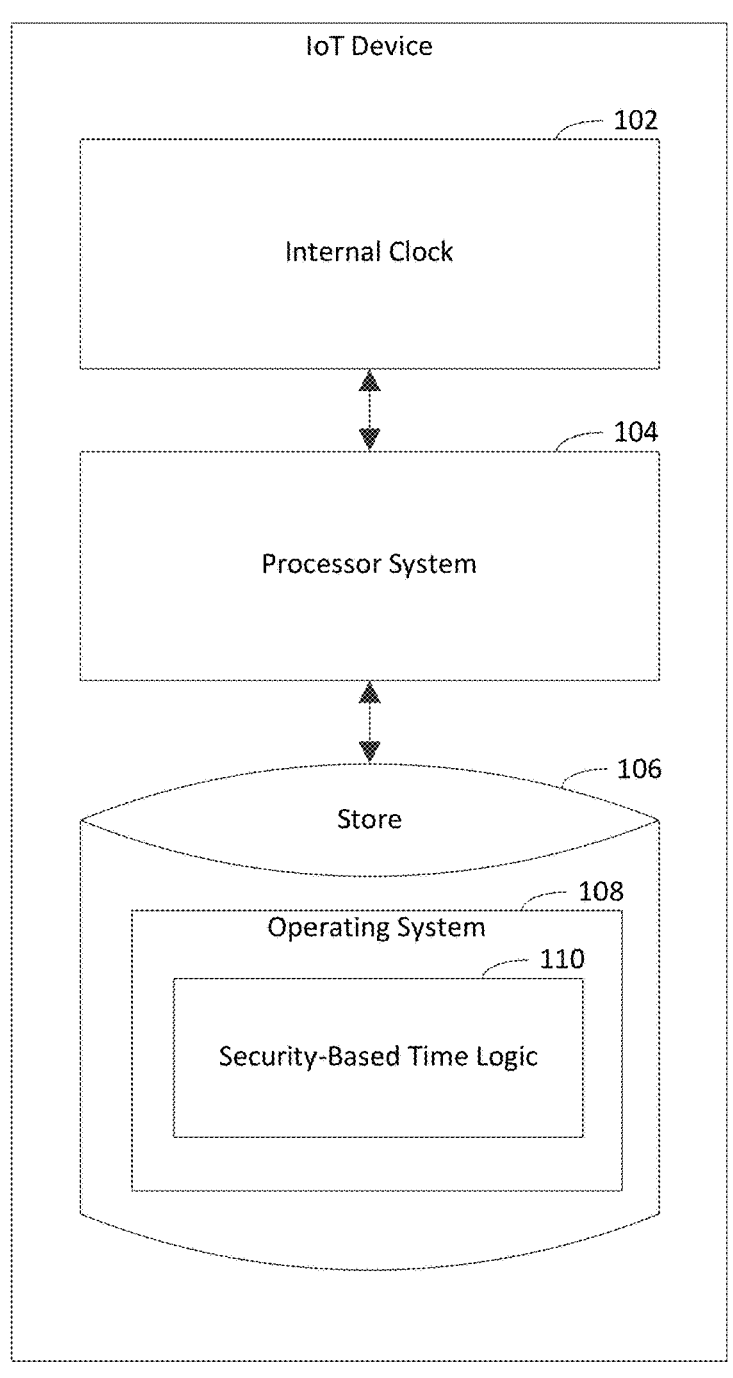
FIG. 1

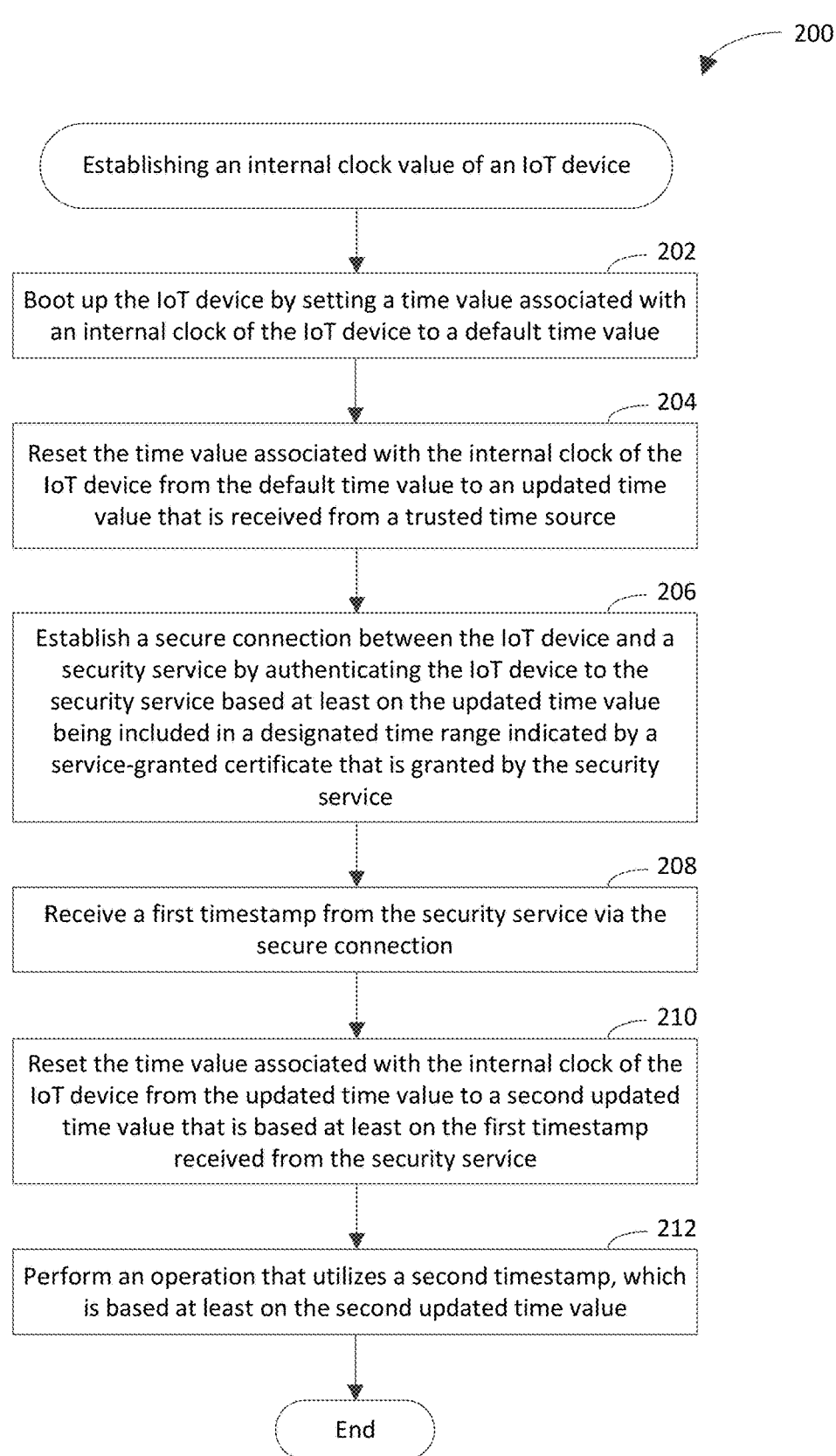

200

Establishing an internal clock value of an IoT device

202

Boot up the IoT device by setting a time value associated with an internal clock of the IoT device to a default time value

204

Reset the time value associated with the internal clock of the IoT device from the default time value to an updated time value that is received from a trusted time source

206

Establish a secure connection between the IoT device and a security service by authenticating the IoT device to the security service based at least on the updated time value being included in a designated time range indicated by a service-granted certificate that is granted by the security service

208

Receive a first timestamp from the security service via the secure connection

210

Reset the time value associated with the internal clock of the IoT device from the updated time value to a second updated time value that is based at least on the first timestamp received from the security service

212

Perform an operation that utilizes a second timestamp, which is based at least on the second updated time value End

FIG. 2

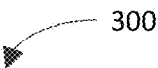

300

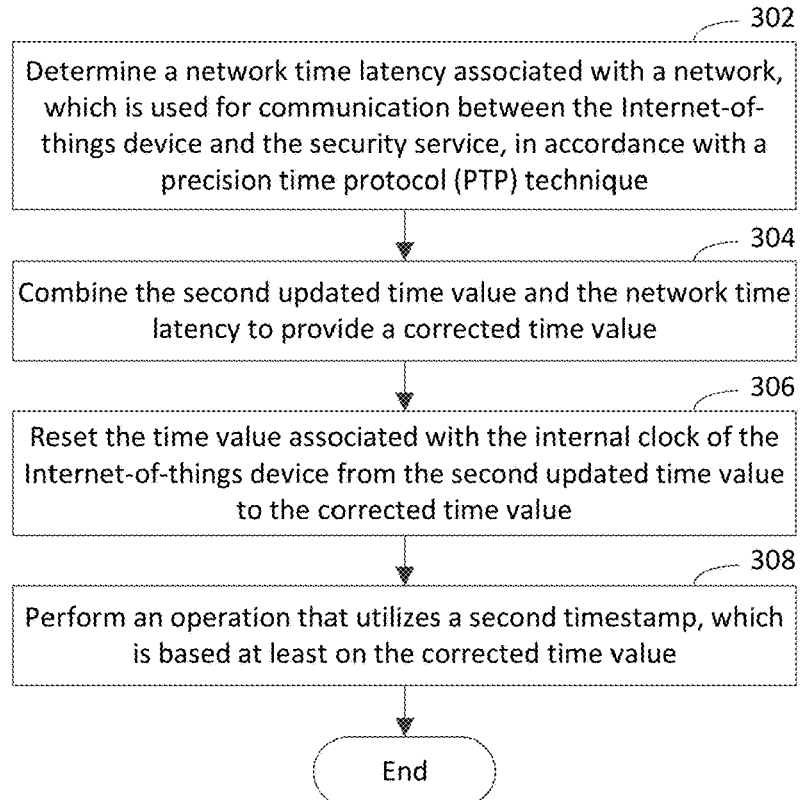

— 302

Determine a network time latency associated with a network, which is used for communication between the Internet-of-things device and the security service, in accordance with a precision time protocol (PTP) technique

— 304

Combine the second updated time value and the network time latency to provide a corrected time value

— 306

Reset the time value associated with the internal clock of the Internet-of-things device from the second updated time value to the corrected time value

— 308

Perform an operation that utilizes a second timestamp, which is based at least on the corrected time value End

FIG. 3

ESTABLISHING AN INTERNAL CLOCK VALUE OF AN INTERNET-OF-THINGS DEVICE BASED ON A TIMESTAMP RECEIVED FROM A SECURITY SERVICE VIA A SECURE CONNECTION

BACKGROUND

An Internet-of-things (IoT) device is an individually addressable device that is capable of communicating with a computing system (e.g., another individually addressable device) via a network, such as the Internet, without human intervention. For instance, IoT devices may transfer data to each other via the network without human intervention. An IoT device typically has a sense of time that is used to communicate, perform security operations, and establish trust. Establishing a sense of time for an IoT device presents challenges that are not common for many other types of devices. For instance, computers in an office (e.g., enterprise) environment typically establish a sense of time by communicating with multiple servers and running relatively complex timing clients to filter through erroneous time measurements and compromised service. However, IoT devices typically do not have access to multiple servers and complex timing clients, which may leave the IoT devices more vulnerable to tampering and attack.

A variety of techniques have been proposed for establishing a sense of time for an IoT device. However, each such technique has its limitations, and those limitations may become more apparent as the IoT device is operated across a variety of geographic, network, and radio frequency (RF) conditions. In one example, the sense of time is established by synchronizing an internal clock of the IoT device with an internal clock of other IoT device(s) using a network time protocol (NTP). However, techniques that utilize NTP (i.e., NTP techniques) often are characterized by relatively low robustness and security and relatively high power consumption. For instance, utilizing NTP through network security layers may be relatively complex and error prone. Moreover, instability of the NTP techniques may result in an IoT device or an entire fleet of IoT devices being untrusted and unconnected for a relatively long period of time. In another example, the sense of time is established using a battery-powered real time clock (RTC) that is installed physically into the IoT device. However, techniques that utilize a RTC (i.e., RTC techniques) often are relatively expensive. Accordingly, the RTC techniques typically are not used in low-cost, prolific IoT devices.

SUMMARY

It may be desirable to establish a sense of time for an Internet-of-things (IoT) device in a manner that addresses the robustness, security, and power-consumption concerns associated with NTP techniques and the cost concerns associated with RTC techniques. By utilizing a timestamp received from a security service (e.g., a cloud-based security service) via a secure connection (e.g., a hypertext transfer protocol secure (HTTPS) connection), the sense of time may be established in a robust, secure, power-sensitive, and cost-effective manner. A security service is a service that provides security features with regard to an IoT device. The security features enable the IoT device to perform security operations. Examples of a security operation include compartmentalizing data and/or code, securing data in use and/or at rest, authentication of the IoT device to a computing device or service (e.g., the security service), authenticating a computing device or service to the IoT device, and establishing a secure connection between the IoT device and a computing device or service. Examples of a security service include an Azure Sphere® security service (a.k.a. "AS3"), developed and distributed by Microsoft Corporation; an impSecure™ security service, developed and distributed by Electric Imp Incorporated; and a Vigishield Secure By Design™ security service, developed and distributed by Timesys Inc. Moreover, the sense of time may be established without a need for additional network firewall rules and/or configurations in network equipment.

Various approaches are described herein for, among other things, establishing a value of an internal clock of an IoT device based at least on (e.g., in response to or as a result of) a timestamp received from a security service via a secure connection. In an example approach, the IoT device is booted up by setting a time value associated with an internal clock of the IoT device to a default time value. The time value associated with the internal clock of the IoT device is reset from the default time value to an updated time value that is received from a trusted time source. A secure connection is established between the IoT device and the security service by authenticating the IoT device to the security service based at least on the updated time value being included in a designated time range indicated by a service-granted certificate that is granted by the security service. A first timestamp is received by the IoT device from the security service via the secure connection. The time value associated with the internal clock of the IoT device is reset from the updated time value to a second updated time value that is based at least on the first timestamp received from the security service. An operation that utilizes a second timestamp, which is based at least on the second updated time value, is performed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 1 is a block diagram of an example Internet-of-things (IoT) device in accordance with an embodiment.

FIGS. 2-3 depict flowcharts of example methods for establishing an internal clock value of an IoT device in accordance with embodiments.

Figure 4:
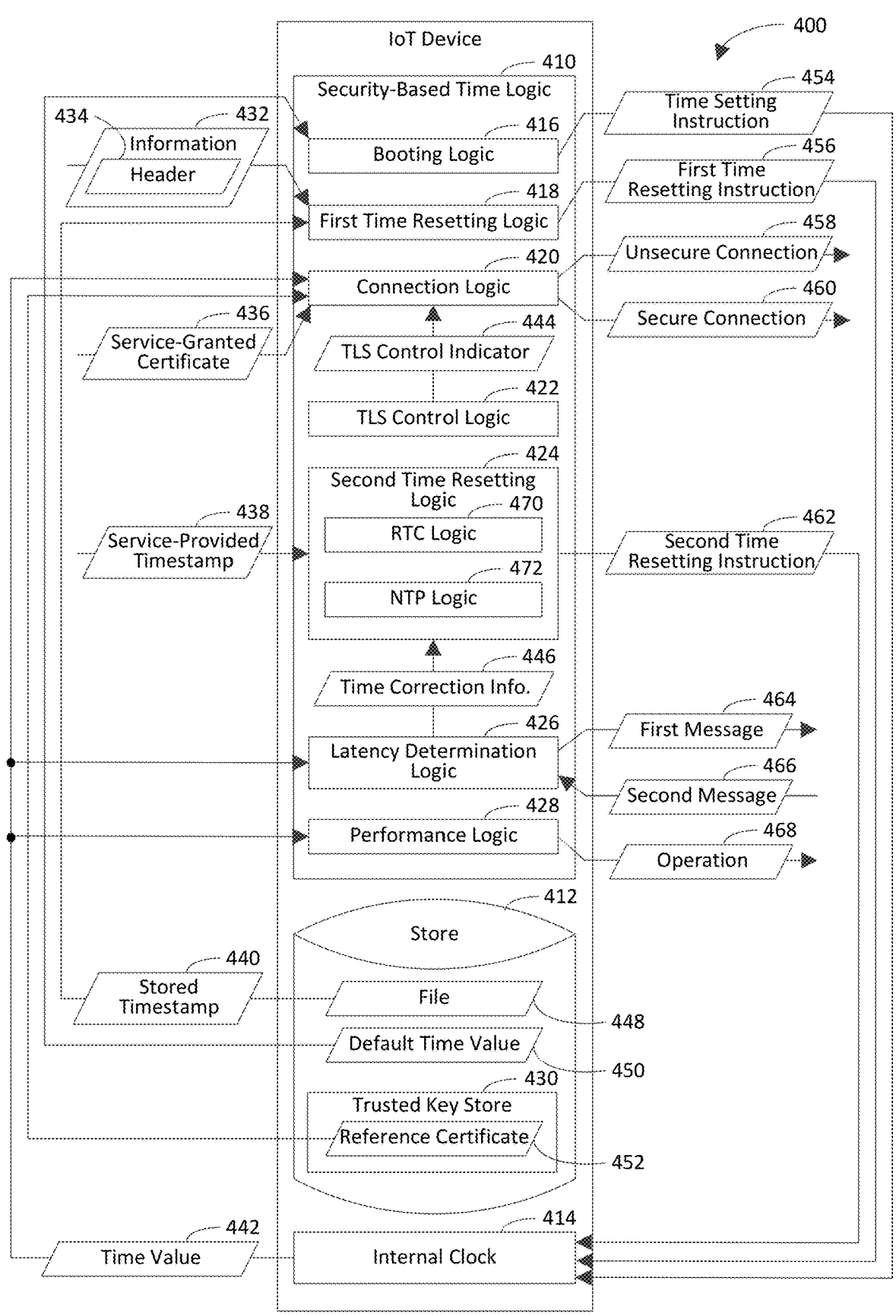
FIG. 4 is a block diagram of another example IoT device in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

It may be desirable to establish a sense of time for an Internet-of-things (IoT) device in a manner that addresses the robustness, security, and power-consumption concerns associated with NTP techniques and the cost concerns associated with RTC techniques. By utilizing a timestamp received from a security service (e.g., a cloud-based security service) via a secure connection (e.g., a hypertext transfer protocol secure (HTTPS) connection), the sense of time may be established in a robust, secure, power-sensitive, and cost-effective manner. A security service is a service that provides security features with regard to an IoT device. The security features enable the IoT device to perform security operations. Examples of a security operation include compartmentalizing data and/or code, securing data in use and/or at rest, authentication of the IoT device to a computing device or service (e.g., the security service), authenticating a computing device or service to the IoT device, and establishing a secure connection between the IoT device and a computing device or service. Examples of a security service include an Azure Sphere® security service (a.k.a. "AS3"), developed and distributed by Microsoft Corporation; an impSecure™ security service, developed and distributed by Electric Imp Incorporated; and a Vigishield Secure By Design™ security service, developed and distributed by Timesys Inc. Moreover, the sense of time may be established without a need for additional network firewall rules and/or configurations in network equipment.

Example embodiments described herein are capable of establishing a value of an internal clock of an IoT device based at least on (e.g., in response to or as a result of) a timestamp received from a security service via a secure connection. Example techniques described herein have a variety of benefits as compared to conventional techniques for establishing a sense of time for an IoT device. For instance, the example techniques are capable of increasing security of an IoT device. In an aspect, the example techniques authenticate the IoT device to a security service to establish a secure connection by proving that a time value received from a trusted time source is within a time range indicated by a certificate that is granted by the security service. In another aspect, the example techniques authenticate the security service to the IoT device to establish the secure connection by proving that the time value received from the trusted time source is within a time range indicated by a certificate stored in a trusted key store (TKS) of the IoT device and/or by proving that the time ranges indicated by the certificate granted by the security service and the certificate stored in the TKS of the IoT device overlap (e.g., are same). Accordingly, the example techniques provide a certificate-backed sense of time based on established trust and synchronize the sense of time with the security service.

Because the time value received from the trusted time source is within the time range necessary for establishing the secure connection (e.g., as indicated by the certificate granted by the security service and/or the certificate stored in the TKS of the IoT device), the IoT device is known to be a trusted entity and is therefore allowed privileged that the IoT device otherwise would not have. For example, because the IoT device is a trusted entity, the IoT device is allowed to receive information (e.g., a timestamp) from the security service via the secure connection. The IoT device may also transmit information to the security service via the secure connection. Receiving a timestamp from the security service via the secure connection enables the IoT device to reset the time value associated with the internal clock of the IoT device to an updated time value that is based at least on the timestamp. In doing so, the IoT device establishes an accurate, trusted sense of time, which is useful for establishing trust and communicating with other entities (e.g., other IoT devices and/or a shared server) and performing security operations.

The example techniques reduce an amount of time and/or resources (e.g., processor cycles, memory, network bandwidth) that is consumed by an IoT device to establish a sense of time. For example, by establishing a secure connection between the IoT device and a security service by authenticating the IoT device to the security service and/or by authenticating the security service to the IoT device, time and resources that otherwise would be consumed to establish the sense of time for the IoT device (e.g., using NTP and/or RTC) are avoided. In another example, by resetting the time value associated with the internal clock of the IoT device to an updated time value that is based at least on a timestamp received from the security service via the secure connection, the time and resources that otherwise would be consumed to establish the sense of time for the IoT device are avoided.

Moreover, by utilizing the secure connection between the IoT device and the security service to establish the sense of time for the IoT device, costs associated with establishing the sense of time are reduced. Accordingly, a cost associated with establishing the sense of time in accordance with any of the example techniques described herein may be less than a cost associated with conventional techniques for establishing the sense of time. By reducing the amount of time and/or resources that is consumed to establish the sense of time for the IoT device, efficiency of the IoT device is increased.

The example techniques are capable of establishing a sense of time for an IoT device more reliably than conventional techniques. For instance, by utilizing a secure connection between the IoT device and a security service to establish the sense of time for the IoT device, a likelihood that the IoT device (e.g., an entire fleet of IoT devices that includes the aforementioned IoT device) will become untrusted and unconnected (e.g., for a relatively long period of time) is reduced. By reducing the likelihood that the IoT device will become untrusted and unconnected, the example techniques improve (e.g., increase) a user experience and an efficiency of a user of the IoT device. The example techniques are capable of providing a sense of time, which is more widely available than a sense of time provided by the conventional techniques, for IoT devices that need to connect outside of a pre-existing network. The example techniques are capable of providing a secure sense of time at scale.

FIG. 1 is a block diagram of an example IoT device 100 in accordance with an embodiment. An Internet-of-things (IoT) device is an individually addressable device that is capable of communicating with a computing system (e.g., another individually addressable device) via a network, such as the Internet, without human intervention. The IoT device

100 is a computing system. A computing system is a system that includes a processor system comprising at least one processor that is capable of manipulating data in accordance with a set of instructions. Example types of a computing system that may be configured as an IoT device include a server computer, a desktop computer, a laptop computer, a tablet computer, a wearable computer such as a smart watch or a head-mounted computer, a personal digital assistant, a cellular telephone, a smart home appliance, or the like.

As shown in FIG. 1, the IoT device 100 includes an internal clock 102, a processor system 104, and a store 106. The internal clock 102 generates a periodic, oscillating, or alternating current (AC) clock signal that is used to synchronize operations performed by the IoT device 100. In an aspect, the internal clock 102 includes a linear oscillator (also known as (a.k.a.) a "harmonic oscillator"). A linear oscillator is an oscillator that generates a sinusoidal (or nearly-sinusoidal) clock signal. Accordingly, the linear oscillator may generate a sine wave to serve as the clock signal. In another aspect, the internal clock 102 includes a non-linear oscillator. A non-linear oscillator is an oscillator that generates a clock signal that is not sinusoidal (or nearly-sinusoidal). For instance, the clock signal generated by the non-linear oscillator may be a square wave or a triangle wave (a.k.a. a "sawtooth wave").

The processor system 104 comprises at least one processor that is capable of manipulating data in accordance with a set of instructions. In an aspect, the processor system 104 executes computer program code (e.g., software and/or firmware) that is stored by the store 106 to perform operations defined by the computer program code. In accordance with this aspect, the processor system 104 executes an operating system 108 that is stored by the store 106.

The store 106 stores the operating system 108. When executed by the processor system 104, the operating system 108 manages resources (e.g., hardware resources, software resources, and/or firmware resources) that are included in the IoT device 100. The operating system 108 may also provide services for execution of applications hosted by the IoT device 100. Examples of an operating system include a real-time operating system (RTOS) (e.g., an Amazon FreeRTOS® operating system, developed and distributed by Amazon.com, Inc.); a Berkeley Software Distribution™ (BSD) operating system, developed and distributed by the Computer Systems Research Group (CSRG) of the University of California, Berkeley, or descendants thereof; a Linux operating system, developed and distributed under the GNU Project; a macOS® operating system, developed and distributed by Apple Inc., a Microsoft Windows® operating system or an Azure Sphere® operating system, developed and distributed by Microsoft Corporation; an Ubuntu® operating system, developed and distributed by Canonical Limited; a UNIX™ operating system, developed and distributed by AT&T; and a Wind River VxWorks® operating system, developed and distributed by Wind River Systems Inc., which is a subsidiary of Aptiv PLC.

The operating system 108 includes security-based time logic 110. The security-based time logic 110 is operable to establish a value (e.g., a time count) of the internal clock 102 based at least on (e.g., in response to or as a result of) a timestamp received from a security service via a secure connection. When executed by the processor system 104, the security-based time logic 110 boots up the IoT device 100 by setting a time value associated with the internal clock 102 to a default time value. The security-based time logic 110 resets the time value associated with the internal clock 102 from the default time value to an updated time value that is received from a trusted time source. The security-based time logic 110 establishes a secure connection between the IoT device 100 and the security service by authenticating the IoT device 100 to the security service based at least on the updated time value being included in a designated time range indicated by a service-granted certificate that is granted by the security service. The security-based time logic 110 receives a first timestamp from the security service via the secure connection. The security-based time logic 110 resets the time value associated with the internal clock 102 from the updated time value to a second updated time value that is based at least on the first timestamp received from the security service. The security-based time logic 110 performs an operation that utilizes a second timestamp, which is based at least on the second updated time value.

A malicious entity may not be able to disrupt the sense of time of the IoT device 100 using a man-in-the-middle attack after the secure connection to the security service is established. The malicious entity may attempt to prevent the IoT device 100 from getting in range of the current time by disrupting the communication protocol bootstrap process (e.g., the hypertext transfer protocol (HTTP) bootstrap process), which occurs prior to establishing the secure connection. However, the attempt may be addressed in a variety of ways. In a first example implementation, IoT devices that are unable to communicate with the security service are not granted valid credentials to connect to other devices and services, which may ensure security for an IoT device (e.g., the IoT device 100) under attack. In a second example implementation, an IoT device 100 can correct the time value associated with the internal clock 102 based on file content stored in the store 106 to cause the time value to be within a time range that is sufficient for establishing a secure connection. By correcting the time value in this way, some man-in-the-middle attacks can be bypassed.

It will be recognized that the security-based time logic 110 need not necessarily be included in the operating system 108. For instance, the security-based time logic 110 may run on the operating system 108.

In an aspect, at least a portion (e.g., all) of the operating system 108 and/or the security-based time logic 110 is implemented in hardware logic/electrical circuitry. Such hardware logic/electrical circuitry may include one or more hardware logic components. Examples of a hardware logic component include a field-programmable gate array (FPGA), an application-specific integrated circuit (ASIC), an application-specific standard product (ASSP), a system-on-a-chip system (SoC), and a complex programmable logic device (CPLD). Each SoC may include an integrated circuit chip that includes one or more of a processor (e.g., a microcontroller, microprocessor, or digital signal processor (DSP)), memory, one or more communication interfaces, and/or further circuits and/or embedded firmware to perform its functions.

It will be recognized that the IoT device 100 may not include one or more of the internal clock 102, the processor system 104, the store 106, the operating system 108, and/or the security-based time logic 110. Furthermore, the IoT device 100 may include components in addition to or in lieu of the internal clock 102, the processor system 104, the store 106, the operating system 108, and/or the security-based time logic 110.

FIGS. 2-3 depict flowcharts 200 and 300 of example methods for establishing an internal clock value of an IoT device in accordance with embodiments. Flowcharts 200 and 300 may be performed by the IoT device 100, shown in FIG. 1, for example. For illustrative purposes, flowcharts 200 and 300 are described with respect to IoT device 400 shown in FIG. 4, which is an example implementation of the IoT device 100. As shown in FIG. 4, the IoT device 400 includes security-based time logic 410, a store 412, and an internal clock 414. The security-based time logic 410 includes booting logic 416, first time resetting logic 418, connection logic 420, TLS control logic 422, second time resetting logic 424, latency determination logic 426, and performance logic 428. The second time resetting logic 424 includes RTC logic 470 and NTP logic 472. The store 412 may be any suitable type of store. One type of store is a database. For instance, the store 412 may be a relational database, an entity-relationship database, an object database, an object relational database, an extensible markup language (XML) database, etc. The store 412 is shown to store a file 448 and a default time value 450 for illustrative purposes. The store 412 includes a trusted key store (TKS) 430. The trusted key store 430 is shown to store a reference certificate 452 for illustrative purposes. Further structural and operational embodiments will be apparent to persons skilled in the relevant art(s) based on the discussion regarding flowcharts 200 and 300.

As shown in FIG. 2, the method of flowchart 200 begins at step 202. In step 202, the IoT device is booted up by setting a time value associated with an internal clock of the IoT device to a default time value. In an aspect, the time value associated with the internal clock of the IoT device indicates a date (e.g., a current day) and/or a time of day (e.g., a current time of the current day). For instance, the time of day may indicate one of the 24 hours in a day (e.g., a current hour of the current day), one of the 60 minutes in an hour (e.g., a current minute of the current hour), and/or one of the 60 seconds in a minute (e.g., a current second of the current minute). Accordingly, the time value associated with the internal clock of the IoT device may be based on a statutory time that is designated by a civilian authority. For example, the statutory time may be a national standard time in a time zone at a fixed offset from Coordinated Universal Time (UTC). In accordance with this example, the national standard time may be adjusted in accordance with Daylight Saving Time (DST). In another example, the default time value may be Jan. 1, 2000. In an example implementation, the booting logic 416 boots up the IoT device 400 by setting a time value 442 associated with the internal clock 414 to the default time value 450. In accordance with this implementation, the booting logic 416 generates a time setting instruction 454, which causes the time value 442 associated with the internal clock 414 to be set to the default time value 450.

At step 204, the time value associated with the internal clock of the IoT device is reset from the default time value to an updated time value that is received from a trusted time source. In an example implementation, the first time resetting logic 418 resets the time value 442 associated with the internal clock 414 from the default time value 450 to the updated time value that is received from the trusted time source. In accordance with this implementation, the first time resetting logic 418 generates a first time resetting instruction 456, which causes the time value 442 associated with the internal clock 414 to be reset from the default time value 450 to the updated time value.

At step 206, a secure connection is established between the IoT device and a security service by authenticating the IoT device to the security service based at least on the updated time value being included in a designated time range indicated by a service-granted certificate that is granted by the security service. In an aspect, the updated time value being included in the designated time range is a prerequisite for establishing the secure connection. The designated time range may be any suitable period of time (e.g., 12 hours, 24 hours, 2 days, or 3 days). In another aspect, the secure connection is relatively robust and therefore has a relatively low likelihood of being blocked by a firewall or being compromised by tampering. In an example implementation, the connection logic 420 establishes a secure connection 460 between the IoT device 400 and the security service by authenticating the IoT device 400 to the security service based at least on the updated time value being included in the designated time range indicated by a service-granted certificate 436 that is granted by the security service.

In an example embodiment, establishing the secure connection between the IoT device and the security service is based on mutual authentication of the IoT device and the security service. In accordance with this embodiment, the IoT device proves to the security service that the IoT device is an entity that the IoT device claims to be, and the security service proves to the IoT device that the security service is an entity that the security service claims to be.

At step 208, a first timestamp is received from the security service via the secure connection. In an aspect, the timestamp is encapsulated fully (e.g., using a transport layer security (TLS) protocol) end-to-end from the security service to the IoT device. The TLS protocol is a cryptographic protocol that provides security for communications over a network. A cryptographic protocol is a protocol that performs a security-related function using at least one cryptographic technique (e.g., encryption, hashing, or cryptographic signing). In another aspect, the timestamp is not decrypted and re-encrypted during its transmission between the security service and the IoT device. In an example implementation, the second time resetting logic 424 receives a service-provided timestamp 438 from the security service via the secure connection 460.

At step 210, the time value associated with the internal clock of the IoT device is reset from the updated time value to a second updated time value that is based at least on the first timestamp received from the security service. In an example implementation, the second time resetting logic 424 resets the time value 442 associated with the internal clock 414 of the IoT device 400 from the updated time value to a second updated time value that is based at least on the service-provided timestamp 438 received from the security service. In accordance with this implementation, the second time resetting logic 424 generates a second time resetting instruction 462, which causes the time value 442 associated with the internal clock 414 to be reset from the updated time value to the second updated time value.

At step 212, an operation that utilizes a second timestamp, which is based at least on the second updated time value, is performed. In an example implementation, the performance logic 428 performs an operation 468 that utilizes the second timestamp.

In an example embodiment, steps 206 and 208 are repeated on a daily basis. For example, by repeating steps 206 and 208 on a daily basis, a variation of the sense of time for the IoT device may be maintained within a designated range. In accordance with this example, the designated range may be one second, two seconds, or three seconds.

In some example embodiments, one or more steps 202, 204, 206, 208, 210, and/or 212 of flowchart 200 are not performed. Moreover, steps in addition to or in lieu of steps 202, 204, 206, 208, 210, and/or 212 may be performed. For instance, in an example embodiment, the method of flowchart 200 further includes storing a reference certificate in a trusted key store (TKS) on the IoT device. In an aspect, the TKS is managed by the security service. In another aspect, the reference certificate is a root certificate of the security service. In yet another aspect, the reference certificate is an x.509 TLS client certificate. In still another aspect, the reference certificate has a specified lifespan. The specified lifespan may be any suitable period of time (e.g., 12 hours, 24 hours, 2 days, or 3 days). In an example implementation, the trusted key store 430 stores the reference certificate 452. For instance, the security-based time logic 410 may store the reference certificate 452 in the trusted key store 430. In accordance with this embodiment, authenticating the IoT device to the security service at step 206 is based at least on a second time range indicated by the reference certificate overlapping at least a portion of the designated time range that includes the updated time value. In an aspect, the updated time value being included in the second time range is a prerequisite for establishing the secure connection. For instance, the second time range indicated by the reference certificate overlapping at least a portion of the designated time range that includes the updated time value may be a prerequisite for establishing the secure connection. In an example implementation, the reference certificate 452 indicates the second time range. In accordance with this implementation, the connection logic 420 authenticates the IoT device 400 to the security service based at least on the second time range, as indicated by the reference certificate 452, overlapping at least a portion of the designated time range that includes the updated time value.

In another example embodiment, the method of flowchart 200 further includes determining the updated time value based at least on the updated time value being indicated by a third timestamp associated with a file that is stored by the IoT device. In an aspect, the file is an update file that updates program code (e.g., software or firmware) stored on the IoT device. For example, the program code may be an operating system that runs on the IoT device or an application that runs on the operating system. In another aspect, the updated time value is a time value that is most recently stored by the IoT device in a memory that is included in the IoT device. In an example implementation, the first time resetting logic 418 determines the updated time value based at least on the updated time value being indicated by a stored timestamp 44 associated with the file 448 that is stored in the store 412.

In yet another example embodiment, the method of flowchart 200 further includes establishing a connection between the Internet-of-things device and an unsecured service endpoint (e.g., an unsecured HTTP service endpoint) in the security service. In an example implementation, the connection logic 420 establishes an unsecure connection 458 (e.g., an HTTP connection) between the IoT device 400 and the unsecured service endpoint in the security service. In accordance with this embodiment, the method of flowchart 200 further includes determining the updated time value based at least on the updated time value being indicated in a header of information received by the IoT device from the unsecured service endpoint. In an aspect, by obtaining the header, which includes the updated time value, from the unsecured service endpoint, the IoT device is capable of authenticating to the security service even after not being powered on for a substantial amount of time. For instance, the IoT device may be capable of authenticating to the security service after sitting in a warehouse unused for many years (e.g., a decade). In an example implementation, the first time resetting logic 418 determines the updated time value based at least on the updated time value being indicated in a header 434 of information 432 received by the IoT device 400 from the unsecured service endpoint.

In a first aspect of this embodiment, the information received by the IoT device from the unsecured service endpoint is a transmission control protocol (TCP) packet. A TCP packet is a packet that is transmitted in compliance with the TCP. The TCP is a protocol that defines how to establish and maintain a conversation between applications via a network. The TCP guarantees that packets, which are transmitted from a transmitting entity to a receiving entity, are unchanged upon receipt at the receiving entity. The TCP also guarantees that, upon receipt of the packets at the receiving entity, the packets are ordered in an order defined by the transmitting entity. The TCP enforces these guarantees using a technique known as "positive acknowledgement with re-transmission," which requires the receiving entity to provide an acknowledgement to the transmitting entity based on receipt of each packet. The transmitting entity maintains a record regarding each packet that is transmitted by the transmitting entity. The transmitting entity also maintains a timer that indicates the amount of time that has passed since each packet has been transmitted. If an acknowledgement indicating that the packet has been received by the receiving entity is not received by the transmitting entity prior to expiration of the timer, the transmitting entity re-transmits the packet.

In a second aspect of this embodiment, the information received by the IoT device from the unsecured service endpoint is an address resolution protocol (ARP) message. An ARP message is a message that is transmitted in compliance with the ARP. The ARP is a communication protocol that is used to determine a link layer address based on an internet layer address. In an example, the link layer address is a media access control (MAC) address. In another example, the internet layer address is an IP address (e.g., an IPv4 address).

In a third aspect of this embodiment, the header includes a nonce token (e.g., an unsecured nonce token) that indicates the updated time value. A nonce token is a token that is used only once in a cryptographic communication. In accordance with this aspect, the unsecured nonce token may include a timestamp that indicates the updated time value.

In a fourth aspect of this embodiment, establishing the connection between the IoT device and the unsecured service endpoint includes providing an HTTP Client for Uniform Resource Locators (CURL) get request to the unsecured service endpoint using a universal resource identifier (URI) associated with the unsecured service endpoint and further includes receiving the information as a response to the HTTP CURL get request. For instance, the URI may be a uniform resource name (URN) or a URL. A HTTP CURL get request is a get request that is initiated using a CURL command line tool.

In a fifth aspect of this embodiment, the method of flowchart 200 further includes disabling transport layer security (TLS) verification with regard to a communication protocol (e.g., an HTTP protocol). In an example implementation, the TLS control logic 422 disables the TLS verification with regard to the communication protocol. In accordance with this implementation, the TLS control logic 422 generates a TLS control indicator 444, which indicates that the TLS verification has been disabled with regard to the communication protocol. In accordance with this aspect, the connection between the IoT device and the unsecured service endpoint is established using the communication protocol based at least on the TLS verification being disabled. In an example implementation, the connection logic 420 determines that the TLS verification has been disabled with regard to the communication protocol based on the TLS control indicator 444. In accordance with this implementation, the connection logic 420 establishes the unsecure connection 458, rather than attempting to establish a secure connection, based on the TLS control indicator 444 indicating that the TLS verification has been disabled with regard to the communication protocol. By establishing the unsecure connection 458 in lieu of attempting to establish a secure connection, a comparison of the time value 442 associated with the internal clock 414 of the IoT device 400 to a time range indicated by the reference certificate 452 may be avoided.

In a sixth aspect of this embodiment, the secure connection between the IoT device and the security service is established further by authenticating the security service to the IoT device. For example, the security service may be authenticated to the IoT device based at least on a private key with which the information from the unsecured service endpoint is signed corresponding to a public key of the security service that is in possession of the IoT device. In an example implementation, the connection logic 420 establishes the secure connection 460 between IoT device 400 and the security service by authenticating the security service to the IoT device 400. For example, the information 432, which includes the header 434, is signed with the private key of the security service. In accordance with this example, the store 412 stores the public key of the security service. In further accordance with this example, the connection logic 420 compares the private key, which is included in the information 432, and the public key, which is stored in the store 412, to determine that the private key corresponds to the public key. In further accordance with this example, the connection logic 420 establishes the secure connection 460 based at least on the determination that the private key corresponds to the public key.

In still another example embodiment, the method of flowchart 200 further includes calculating a time of day by tracking passage of time with reference to the second updated time value using a real time clock (RTC) while the IoT device is powered off. In an aspect, the RTC is battery-powered, which enables the RTC to operate while the IoT device is powered off. In an example implementation, the RTC logic 470 calculates the time of day by tracking the passage of time with reference to the second updated time value while the IoT device 400 is powered off. In accordance with this embodiment, the second timestamp is based at least on the time of day.

In another example embodiment, the method of flowchart 200 further includes identifying a synchronized time value that is synchronized between the IoT device and a computing device in accordance with a network time protocol (NTP) technique. In an example implementation, the NTP logic 472 identifies a synchronized time value that is synchronized between the IoT device 400 and the computing device in accordance with the NTP technique. In accordance with this embodiment, the method of flowchart 200 further includes providing a communication that indicates the synchronized time value to the computing device. In an example implementation, the performance logic 428 provides the communication to the computing device. In an aspect, the performance logic 428 receives an indicator that specifies the synchronized time value from the NTP logic 472 and configures the communication to indicate the synchronized time value based at least on the indicator that is received from the NTP logic 472.

In yet another example embodiment, step 212 of flowchart 200 is replaced with steps 302, 304, 306. and 308 of flowchart 300 shown in FIG. 3. As shown in FIG. 3, the method of flowchart 300 begins at step 302. In step 302, a network time latency associated with a network is determined in accordance with a precision time protocol (PTP) technique. A PTP technique is a technique that uses the PTP to synchronize clocks in a network. The PTP is a protocol that is used to measure time latency (a.k.a. path delay) associated with a network. In accordance with this embodiment, the network is used for communication between the IoT device and the security service. The network time latency is determined by combining a first measurement of a first amount of time, which a first message takes to travel from the IoT device to a server via the network, and a second measurement of a second amount of time, which a second message takes to travel from the server to the IoT device via the network. In an aspect, the network time latency is determined by averaging the first amount of time and the second amount of time. In another aspect, the network time latency is determined by calculating a difference between the first amount of time and the second amount of time. For instance, the first amount of time may be subtracted from the second amount of time, or vice versa, to determine the network time latency. In yet another aspect, the network time latency is determined by calculating a sum of the first amount of time and the second amount of time. In an example implementation, the latency determination logic 426 determines the network time latency associated with the network in accordance with the PTP technique by combining a first measurement of a first amount of time, which a first message 464 takes to travel from the IoT device 400 to the server via the network, and a second measurement of a second amount of time, which a second message 466 takes to travel from the server to the IoT device 400 via the network. In accordance with this implementation, the network is used for communication between the IoT device 400 and the security service. In further accordance with this implementation, the latency determination logic 426 generates time correction information 446, which indicates the network time latency associated with the network.

At step 304, the second updated time value and the network time latency are combined to provide a corrected time value. In an aspect, the corrected time value is determined by adding the network time latency to the second updated time value. In another aspect, the corrected time value is determined by subtracting the network time latency from the second updated time value. In an example implementation, the second time resetting logic 424 combines the second updated time value and the network time latency, as indicated by the time correction information 446, to provide the corrected time value.

At step 306, the time value associated with the internal clock of the IoT device is reset from the second updated time value to the corrected time value. In an example implementation, the second time resetting logic 424 resets the time value associated with the internal clock 414 from the second updated time value to the corrected time value. In accordance with this implementation, the second time resetting logic 424 generates the second time resetting instruction 462, which causes the time value 442 associated with the internal clock 414 to be reset from the second updated time value to the corrected time value.

At step 308, an operation that utilizes a second timestamp, which is based at least on the corrected time value, is performed. In an example implementation, the performance logic 428 performs an operation 468 that utilizes the second timestamp.

It will be recognized that the IoT device 400 may not include one or more of the security-based time logic 410, the store 412, the internal clock 414, the booting logic 416, the first time resetting logic 418, the connection logic 420, the TLS control logic 422, the second time resetting logic 424, the latency determination logic 426, the performance logic 428, the trusted key store 430, the RTC logic 470, and/or the NTP logic 472. Furthermore, the IoT device 400 may include components in addition to or in lieu of the security-based time logic 410, the store 412, the internal clock 414, the booting logic 416, the first time resetting logic 418, the connection logic 420, the TLS control logic 422, the second time resetting logic 424, the latency determination logic 426, the performance logic 428, the trusted key store 430, the RTC logic 470, and/or the NTP logic 472.

Figure 5:
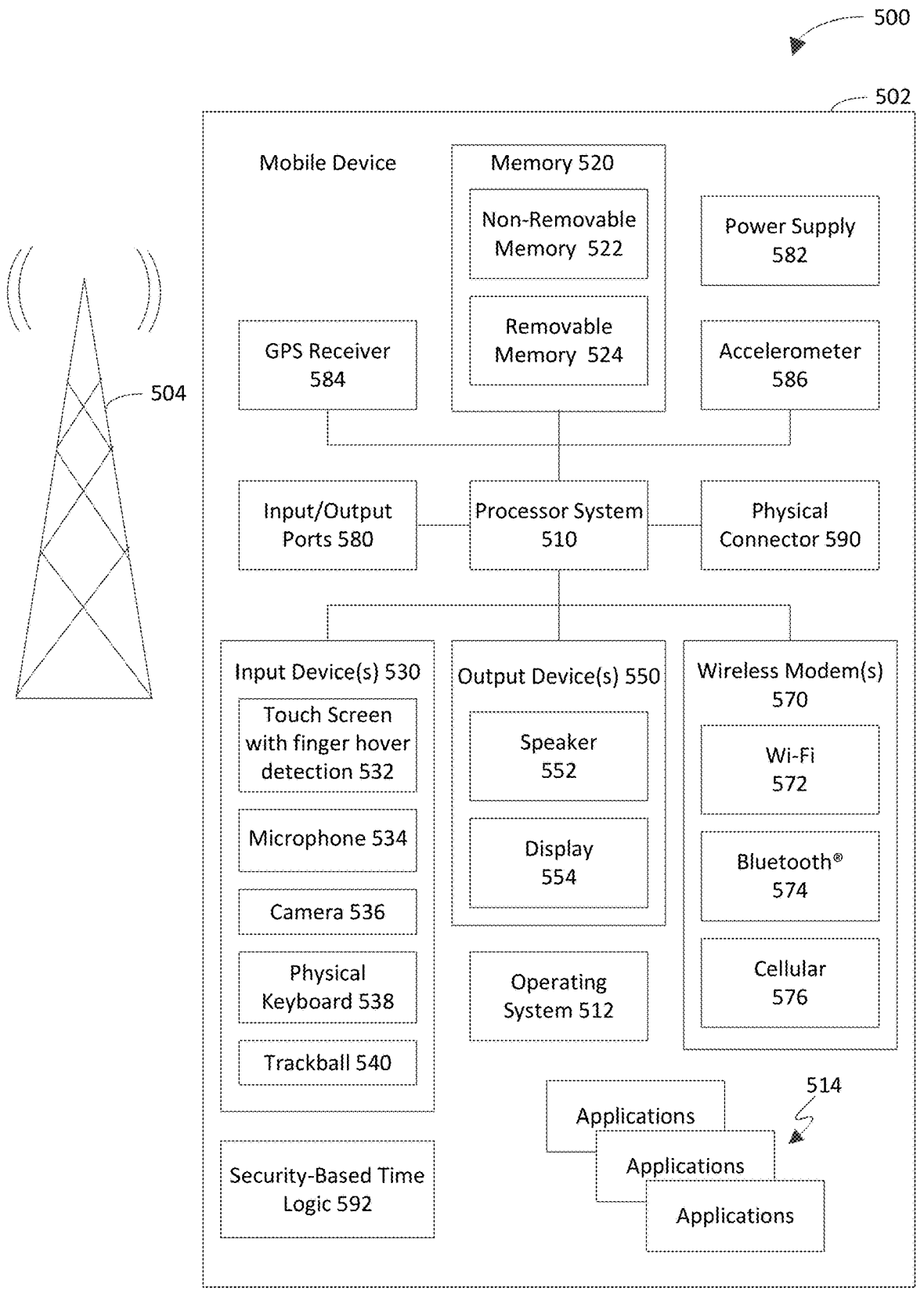
FIG. 5 is a system diagram of an example mobile IoT device in accordance with an embodiment.

FIG. 5 is a system diagram of an example mobile IoT device 500 including a variety of optional hardware and software components, shown generally as 502. Any components 502 in the mobile IoT device 500 may communicate with any other component, though not all connections are shown, for ease of illustration. The mobile IoT device 500 may be implemented as any suitable type of computing device (e.g., a cell phone, a smartphone, a handheld computer, or a Personal Digital Assistant (PDA)) and may allow wireless two-way communications with one or more mobile communications networks 504, such as a cellular or satellite network, or with a local area or wide area network.

The mobile IoT device 500 includes a processor system 510 (e.g., signal processor, microprocessor, ASIC, or other control and processing logic circuitry) for performing such tasks as signal coding, data processing, input/output processing, power control, and/or other functions. An operating system 512 may control the allocation and usage of the components 502 and support for one or more applications 514 (a.k.a. application programs). The applications 514 may include common mobile computing applications (e.g., email applications, calendars, contact managers, web browsers, messaging applications) and any other computing applications (e.g., word processing applications, mapping applications, media player applications).

The mobile IoT device 500 includes security-based time logic 592, which is operable in a manner similar to the security-based time logic 110 described above with reference to FIG. 1 and/or the security-based time logic 410 described above with reference to FIG. 4.

The mobile IoT device 500 includes memory 520. The memory 520 may include non-removable memory 522 and/or removable memory 524. The non-removable memory 522 may include random access memory (RAM), read-only memory (ROM), flash memory, a hard disk, or other well-known memory storage technologies. The removable memory 524 may include flash memory or a Subscriber Identity Module (SIM) card, which is well known in Global System for Mobile Communications (GSM) systems, or other well-known memory storage technologies, such as "smart cards." The memory 520 may store data and/or code for running the operating system 512, the applications 514, and the security-based time logic 592. Example data may include web pages, text, images, sound files, video data, or other data sets to be sent to and/or received from one or more network servers or other devices via one or more wired or wireless networks. Memory 520 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile IoT device 500 may support one or more input devices 530, such as a touch screen 532, microphone 534, camera 536, physical keyboard 538 and/or trackball 540 and one or more output devices 550, such as a speaker 552 and a display 554. Touch screens, such as the touch screen 532, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 532 may support a finger hover detection using capacitive sensing, as is well understood. Other detection techniques may be used, including camera-based detection and ultrasonic-based detection. To implement a finger hover, a user's finger is typically within a predetermined spaced distance above the touch screen, such as 0.1 to 0.25 inches, or 0.25 inches to 0.5 inches, or 0.5 inches to 0.75 inches, or 0.75 inches to 1 inch, or 1 inch to 1.5 inches, etc.

Other possible output devices (not shown) may include piezoelectric or other haptic output devices. Some devices may serve more than one input/output function. For example, touch screen 532 and display 554 may be combined in a single input/output device. The input devices 530 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 512 or applications 514 may include speech-recognition software as part of a voice control interface that allows a user to operate the mobile IoT device 500 via voice commands. Furthermore, the mobile IoT device 500 may include input devices and software that allows for user interaction via a user's spatial gestures, such as detecting and interpreting gestures to provide input to a gaming application.

Wireless modem(s) 570 may be coupled to antenna(s) (not shown) and may support two-way communications between the processor system 510 and external devices, as is well understood in the art. The modem(s) 570 are shown generically and may include a cellular modem 576 for communicating with the mobile communication network 504 and/or other radio-based modems (e.g., Bluetooth® 574 and/or Wi-Fi 572). At least one of the wireless modem(s) 570 is typically configured for communication with one or more cellular networks, such as a GSM network for data and voice communications within a single cellular network, between cellular networks, or between the mobile IoT device 500 and a public switched telephone network (PSTN).

The mobile IoT device 500 may further include at least one input/output port 580, a power supply 582, a satellite navigation system receiver 584, such as a Global Positioning System (GPS) receiver, an accelerometer 586, and/or a physical connector 590, which may be a universal serial bus (USB) port, IEEE 1394 (FireWire) port, and/or RS-232 port. The illustrated components 502 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the internal clock 102, the security-based time logic 110, the security-based time logic 410, the internal clock 414, the booting logic 416, the first time resetting logic 418, the connection logic 420, the TLS control logic 422, the second time resetting logic 424, the latency determination logic 426, the performance logic 428, the RTC logic 470, the NTP logic 472, flowchart 200, and/or flowchart 300 may be implemented in hardware, software, firmware, or any combination thereof.

For example, any one or more of the internal clock 102, the security-based time logic 110, the security-based time logic 410, the internal clock 414, the booting logic 416, the first time resetting logic 418, the connection logic 420, the TLS control logic 422, the second time resetting logic 424, the latency determination logic 426, the performance logic 428, the RTC logic 470, the NTP logic 472, flowchart 200, and/or flowchart 300 may be implemented, at least in part, as computer program code configured to be executed in one or more processors.

In another example, any one or more of the internal clock 102, the security-based time logic 110, the security-based time logic 410, the internal clock 414, the booting logic 416, the first time resetting logic 418, the connection logic 420, the TLS control logic 422, the second time resetting logic 424, the latency determination logic 426, the performance logic 428, the RTC logic 470, the NTP logic 472, flowchart 200, and/or flowchart 300 may be implemented, at least in part, as hardware logic/electrical circuitry. Such hardware logic/electrical circuitry may include one or more hardware logic components. Examples of a hardware logic component include a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 6:
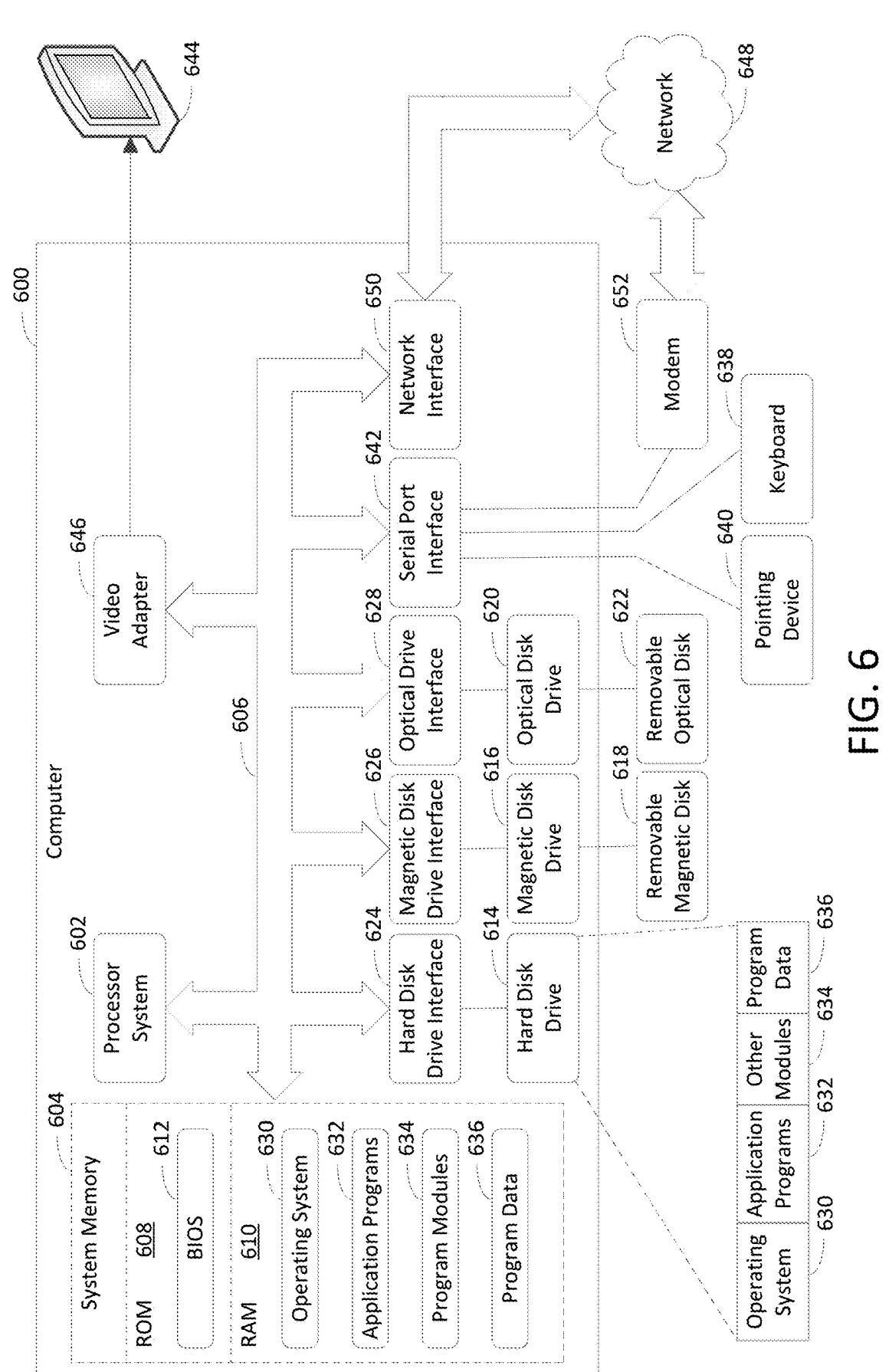
FIG. 6 depicts an example computer in which embodiments may be implemented.

II. Further Discussion of Some Example Embodiments (A1) An example Internet-of-things device (FIG. 1, 100; FIG. 4, 400; FIG. 5, 502; FIG. 6, 600) comprises a processor system (FIG. 1, 104; FIG. 5, 510; FIG. 6, 602) and a memory (FIG. 1, 106; FIG. 5, 520, 522; FIG. 6, 604, 608, 610) coupled to the processor system. The memory stores an operating system (FIG. 1, 108; FIG. 5, 512; FIG. 6, 630) that, when executed, performs actions. The actions include boot up (FIG. 2, 202) the Internet-of-things device by setting a time value (FIG. 4, 442) associated with an internal clock (FIG. 1, 102; FIG. 4, 414) of the Internet-of-things device to a default time value (FIG. 4, 450). The actions further include reset (FIG. 2, 204) the time value associated with the internal clock of the Internet-of-things device from the default time value to an updated time value that is received from a trusted time source. The actions further include establish (FIG. 2, 206) a secure connection (FIG. 4, 460) between the Internet-of-things device and a security service by authenticating the Internet-of-things device to the security service based at least on the updated time value being included in a designated time range indicated by a service-granted certificate (FIG. 4, 436) that is granted by the security service. The actions further include receive (FIG. 2, 208) a first timestamp from the security service via the secure connection. The actions further include reset (FIG. 2, 210) the time value associated with the internal clock of the Internet-of-things device from the updated time value to a second updated time value that is based at least on the first timestamp received from the security service. The actions further include perform (FIG. 2, 212) an operation that utilizes a second timestamp, which is based at least on the second updated time value.

(A2) In the example Internet-of-things device of A1, wherein the memory comprises: a trusted key store (TKS) that stores a reference certificate; and wherein the operating system, when executed, authenticates the Internet-of-things device to the security service further based at least on a second time range indicated by the reference certificate overlapping at least a portion of the designated time range that includes the updated time value.

(A3) In the example Internet-of-things device of any of A1-A2, wherein the memory further stores a file; and wherein the operating system, when executed, performs the actions further comprising: determine the updated time value based at least on the updated time value being indicated by a third timestamp associated with the file.

(A4) In the example Internet-of-things device of any of A1-A3, wherein the operating system, when executed, performs the actions further comprising: establish a connection between the Internet-of-things device and an unsecured service endpoint in the security service; and determine the updated time value based at least on the updated time value being indicated in a header of information received by the Internet-of-things device from the unsecured service endpoint.

(A5) In the example Internet-of-things device of any of A1-A4, wherein the operating system, when executed, performs the actions further comprising: disable transport layer security (TLS) verification with regard to a communication protocol; and wherein the operating system, when executed, establishes the connection between the Internet-of-things device and the unsecured service endpoint using the communication protocol based at least on the TLS verification being disabled.

(A6) In the example Internet-of-things device of any of A1-A5, wherein the memory further stores a public key of the security service; wherein the information from the unsecured service endpoint is signed with a private key of the security service; and wherein the operating system, when executed, establishes the secure connection between the Internet-of-things device and the security service further by authenticating the security service to the Internet-of-things device based at least on the private key with which the information from the unsecured service endpoint is signed corresponding to the public key of the security service.

(A7) In the example Internet-of-things device of any of A1-A6, wherein the operating system, when executed, performs the actions further comprising: determine a network time latency associated with a network, which is used for communication between the Internet-of-things device and the security service, in accordance with a precision time protocol (PTP) technique by combining the following: a first measurement of a first amount of time that a first message takes to travel from the Internet-of-things device to a server via the network; and a second measurement of a second amount of time that a second message takes to travel from the server to the Internet-of-things device via the network; combine the second updated time value and the network time latency to provide a corrected time value; and reset the time value associated with the internal clock of the Internet-of-things device from the second updated time value to the corrected time value; and wherein the second timestamp is based at least on the corrected time value.

(A8) In the example Internet-of-things device of any of A1-A7, further comprising: a real time clock (RTC) that calculates a time of day by tracking passage of time with reference to the second updated time value while the Internet-of-things device is powered off; wherein the second timestamp is based at least on the time of day.

(A9) In the example Internet-of-things device of any of A1-A8, wherein the operating system, when executed, performs the actions further comprising: identify a synchronized time value that is synchronized between the Internet-of-things device and a computing device in accordance with a network time protocol (NTP) technique; and provide a communication that indicates the synchronized time value to the computing device.

(B1) An example method is implemented by an operating system (FIG. 1, 108; FIG. 5, 512; FIG. 6, 630) of an Internet-of-things device (FIG. 1, 100; FIG. 4, 400; FIG. 5, 502; FIG. 6, 600). The method comprises booting up (FIG. 2, 202) the Internet-of-things device by setting a time value (FIG. 4, 442) associated with an internal clock (FIG. 1, 102; FIG. 4, 414) of the Internet-of-things device to a default time value (FIG. 4, 450). The method further comprises resetting (FIG. 2, 204) the time value associated with the internal clock of the Internet-of-things device from the default time value to an updated time value that is received from a trusted time source. The method further comprises establishing (FIG. 2, 206) a secure connection (FIG. 4, 460) between the Internet-of-things device and a security service by authenticating the Internet-of-things device to the security service based at least on the updated time value being included in a designated time range indicated by a service-granted certificate (FIG. 4, 436) that is granted by the security service. The method further comprises receiving (FIG. 2, 208) a first timestamp from the security service via the secure connection. The method further comprises resetting (FIG. 2, 210) the time value associated with the internal clock of the Internet-of-things device from the updated time value to a second updated time value that is based at least on the first timestamp received from the security service. The method further comprises performing (FIG. 2, 212) an operation that utilizes a second timestamp, which is based at least on the second updated time value.

(B2) In the example method of B1, further comprising: storing a reference certificate in a trusted key store (TKS) on the Internet-of-things device; wherein authenticating the Internet-of-things device to the security service is based at least on a second time range indicated by the reference certificate overlapping at least a portion of the designated time range that includes the updated time value.

(B3) In the example method of any of B1-B2, further comprising: determining the updated time value based at least on the updated time value being indicated by a third timestamp associated with a file that is stored by the Internet-of-things device.

(B4) In the example method of any of B1-B3, further comprising: establishing a connection between the Internet-of-things device and an unsecured service endpoint in the security service; and determining the updated time value based at least on the updated time value being indicated in a header of information received by the Internet-of-things device from the unsecured service endpoint.

(B5) In the example method of any of B1-B4, further comprising: disabling transport layer security (TLS) verification with regard to a communication protocol; wherein the connection between the Internet-of-things device and the unsecured service endpoint is established using the communication protocol based at least on the TLS verification being disabled.

(B6) In the example method of any of B1-B5, wherein the secure connection between the Internet-of-things device and the security service is established further by authenticating the security service to the Internet-of-things device based at least on a private key with which the information from the unsecured service endpoint is signed corresponding to a public key of the security service that is in possession of the Internet-of-things device.

(B7) In the example method of any of B1-B6, further comprising: determining a network time latency associated with a network, which is used for communication between the Internet-of-things device and the security service, in accordance with a precision time protocol (PTP) technique by combining a first measurement of a first amount of time, which a first message takes to travel from the Internet-of-things device to a server via the network, and a second measurement of a second amount of time, which a second message takes to travel from the server to the Internet-of-things device via the network; combining the second updated time value and the network time latency to provide a corrected time value; and resetting the time value associated with the internal clock of the Internet-of-things device from the second updated time value to the corrected time value; wherein the second timestamp is based at least on the corrected time value.

(B8) In the example method of any of B1-B7, further comprising: calculating a time of day by tracking passage of time with reference to the second updated time value using a real time clock (RTC) while the Internet-of-things device is powered off; wherein the second timestamp is based at least on the time of day.

(B9) In the example method of any of B1-B8, further comprising: identifying a synchronized time value that is synchronized between the Internet-of-things device and a computing device in accordance with a network time protocol (NTP) technique; and providing a communication that indicates the synchronized time value to the computing device.

(C1) An example computer program product (FIG. 5, 524; FIG. 6, 618, 622) comprising a computer-readable storage medium having instructions recorded thereon for enabling a processor-based system (FIG. 1, 100; FIG. 4, 400; FIG. 5, 502; FIG. 6, 600) to perform actions. The actions comprise booting up (FIG. 2, 202) the processor-based system by setting a time value (FIG. 4, 442) associated with an internal clock (FIG. 1, 102; FIG. 4, 414) of the processor-based system to a default time value (FIG. 4, 450). The actions further comprise resetting (FIG. 2, 204) the time value associated with the internal clock of the processor-based system from the default time value to an updated time value that is received from a trusted time source. The actions further comprise establishing (FIG. 2, 206) a secure connection (FIG. 4, 460) between the processor-based system and a security service by authenticating the processor-based system to the security service based at least on the updated time value being included in a designated time range indicated by a service-granted certificate (FIG. 4, 436) that is granted by the security service. The actions further comprise receiving (FIG. 2, 208) a first timestamp from the security service via the secure connection. The actions further comprise resetting (FIG. 2, 210) the time value associated with the internal clock of the processor-based system from the updated time value to a second updated time value that is based at least on the first timestamp received from the security service. The actions further comprise performing (FIG. 2, 212) an operation that utilizes a second timestamp, which is based at least on the second updated time value.

(C2) In the example computer program product of C1, wherein the actions comprise: authenticating the processor-based system to the security service based at least on a second time range indicated by a reference certificate, which is stored in a trusted key store (TKS) of the processor-based system, overlapping at least a portion of the designated time range that includes the updated time value.

III. Example Computer System

FIG. 6 depicts an example computer 600 in which embodiments may be implemented. The IoT device 100 shown in FIG. 1 and/or the IoT device 400 shown in FIG. 4 may be implemented in computer 600, including one or more features of computer 600 and/or alternative features. Computer 600 may be a general-purpose computing device in the form of a conventional personal computer, a mobile computer, or a workstation, for example, or computer 600 may be a special purpose computing device. The description of computer 600 provided herein is provided for purposes of illustration, and is not intended to be limiting. Embodiments may be implemented in further types of computer systems, as would be known to persons skilled in the relevant art(s).

As shown in FIG. 6, computer 600 includes a processor system 602, a system memory 604, and a bus 606 that couples various system components including system memory 604 to processor system 602. Bus 606 represents one or more of any of several types of bus structures, including a memory bus or memory controller, a peripheral bus, an accelerated graphics port, and a processor or local bus using any of a variety of bus architectures. System memory 604 includes read only memory (ROM) 608 and random access memory (RAM) 610. A basic input/output system (BIOS) 612 is stored in ROM 608.

Computer 600 also has one or more of the following drives: a hard disk drive 614 for reading from and writing to a hard disk, a magnetic disk drive 616 for reading from or writing to a removable magnetic disk 618, and an optical disk drive 620 for reading from or writing to a removable optical disk 622 such as a CD ROM, DVD ROM, or other optical media. Hard disk drive 614, magnetic disk drive 616, and optical disk drive 620 are connected to bus 606 by a hard disk drive interface 624, a magnetic disk drive interface 626, and an optical drive interface 628, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 630, one or more application programs 632, other program modules 634, and program data 636. Application programs 632 or program modules 634 may include, for example, computer program logic for implementing any one or more of (e.g., at least a portion of) the internal clock 102, the security-based time logic 110, the security-based time logic 410, the internal clock 414, the booting logic 416, the first time resetting logic 418, the connection logic 420, the TLS control logic 422, the second time resetting logic 424, the latency determination logic 426, the performance logic 428, the RTC logic 470, the NTP logic 472, flowchart 200 (including any step of flowchart 200), and/or flowchart 300 (including any step of flowchart 300), as described herein.

A user may enter commands and information into the computer 600 through input devices such as keyboard 638 and pointing device 640. Other input devices (not shown) may include a microphone, joystick, game pad, satellite dish, scanner, touch screen, camera, accelerometer, gyroscope, or the like. These and other input devices are often connected to the processor system 602 through a serial port interface 642 that is coupled to bus 606, but may be connected by other interfaces, such as a parallel port, game port, or a universal serial bus (USB).

A display device 644 (e.g., a monitor) is also connected to bus 606 via an interface, such as a video adapter 646. In addition to display device 644, computer 600 may include other peripheral output devices (not shown) such as speakers and printers.

Computer 600 is connected to a network 648 (e.g., the Internet) through a network interface (e.g., a network adapter) 650, a modem 652, or other means for establishing communications over the network. Modem 652, which may be internal or external, is connected to bus 606 via serial port interface 642.

As used herein, the terms "computer program medium" and "computer-readable storage medium" are used to generally refer to media (e.g., non-transitory media) such as the hard disk associated with hard disk drive 614, removable magnetic disk 618, removable optical disk 622, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, communication media includes wireless media such as acoustic, RF, infrared and other wireless media, as well as wired media. Example embodiments are also directed to such communication media.

As noted above, computer programs and modules (including application programs 632 and other program modules 634) may be stored on the hard disk, magnetic disk, optical disk, ROM, or RAM. Such computer programs may also be received via network interface 650 or serial port interface 642. Such computer programs, when executed or loaded by an application, enable computer 600 to implement features of embodiments discussed herein. Accordingly, such computer programs represent controllers of the computer 600.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate example embodiments of the present disclosure. However, the scope of the present disclosure is not limited to these embodiments, but is instead defined by the appended claims. Thus, embodiments beyond those shown in the accompanying drawings, such as modified versions of the illustrated embodiments, may nevertheless be encompassed by the present disclosure.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first," "second," and "third" are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. An Internet-of-things device comprising:
a processor system; and
a memory coupled to the processor system, the memory storing an operating system that, when executed, performs actions comprising:
 boot up the Internet-of-things device by setting a time value associated with an internal clock of the Internet-of-things device to a default time value;
 reset the time value associated with the internal clock of the Internet-of-things device from the default time value to an updated time value, which is received from a trusted time source;
 establish a secure connection between the Internet-of-things device and a security service by authenticating the Internet-of-things device to the security service based at least on the updated time value being included in a designated time range indicated by a service-granted certificate that is granted by the security service;
 receive a first timestamp from the security service via the secure connection;
 reset the time value associated with the internal clock of the Internet-of-things device from the updated time value to a second updated time value that is based at least on the first timestamp received from the security service;
 combine the second updated time value and a network time latency associated with a network, which is used for communication between the Internet-of-things device and the security service, to provide a corrected time value; and
 reset the time value associated with the internal clock of the Internet-of-things device from the second updated time value to the corrected time value; and
 perform an operation that utilizes a second timestamp, which is based at least on the second corrected time value.

2. The Internet-of-things device of claim 1, wherein the memory comprises:
a trusted key store (TKS) that stores a reference certificate; and
wherein the operating system, when executed, authenticates the Internet-of-things device to the security service further based at least on a second time range indicated by the reference certificate overlapping at least a portion of the designated time range that includes the updated time value.

3. The Internet-of-things device of claim 1, wherein the memory further stores a file; and
wherein the operating system, when executed, performs the actions further comprising:
 determine the updated time value as a result of the updated time value being indicated by a third timestamp associated with the file.

4. The Internet-of-things device of claim 1, wherein the operating system, when executed, performs the actions further comprising:
 establish a connection between the Internet-of-things device and an unsecured service endpoint in the security service; and
 determine the updated time value based at least on the updated time value being indicated in a header of information received by the Internet-of-things device from the unsecured service endpoint.

5. The Internet-of-things device of claim 4, wherein the operating system, when executed, performs the actions further comprising:

disable transport layer security (TLS) verification with regard to a communication protocol; and wherein the operating system, when executed, establishes the connection between the Internet-of-things device and the unsecured service endpoint using the communication protocol based at least on the TLS verification being disabled.

6. The Internet-of-things device of claim 4, wherein the memory further stores a public key of the security service;

wherein the information from the unsecured service endpoint is signed with a private key of the security service; and wherein the operating system, when executed, establishes the secure connection between the Internet-of-things device and the security service further by authenticating the security service to the Internet-of-things device based at least on the private key with which the information from the unsecured service endpoint is signed corresponding to the public key of the security service.

7. The Internet-of-things device of claim 1, wherein the operating system, when executed, performs the actions further comprising:

determine the network time latency in accordance with a precision time protocol (PTP) technique by combining the following:

a first measurement of a first amount of time that a first message takes to travel from the Internet-of-things device to a server via the network; and a second measurement of a second amount of time that a second message takes to travel from the server to the Internet-of-things device via the network.

8. The Internet-of-things device of claim 1, further comprising:

a real time clock (RTC) that calculates a time of day by tracking passage of time with reference to the second updated time value while the Internet-of-things device is powered off;

wherein the second timestamp is based at least on the time of day.

9. The Internet-of-things device of claim 1, wherein the operating system, when executed, performs the actions further comprising:

identify a synchronized time value that is synchronized between the Internet-of-things device and a computing device in accordance with a network time protocol (NTP) technique; and provide a communication that indicates the synchronized time value to the computing device.

10. A method implemented by an operating system of an Internet-of-things device, the method comprising:

booting up the Internet-of-things device by setting a time value associated with an internal clock of the Internet-of-things device to a default time value;

resetting the time value associated with the internal clock of the Internet-of-things device from the default time value to an updated time value that is received from a trusted time source;

establishing a secure connection between the Internet-of-things device and a security service by authenticating the Internet-of-things device to the security service based at least on the updated time value being included in a designated time range indicated by a service-granted certificate that is granted by the security service;

receiving a first timestamp from the security service via the secure connection;

resetting the time value associated with the internal clock of the Internet-of-things device from the updated time value to a second updated time value that is based at least on the first timestamp received from the security service;

combining the second updated time value and a network time latency associated with a network, which is used for communication between the Internet-of-things device and the security service, to provide a corrected time value;

resetting the time value associated with the internal clock of the Internet-of-things device from the second updated time value to the corrected time value; and performing an operation that utilizes a second timestamp, which is based at least on the second corrected time value.

11. The method of claim 10, further comprising:

storing a reference certificate in a trusted key store (TKS) on the Internet-of-things device;

wherein authenticating the Internet-of-things device to the security service is based at least on a second time range indicated by the reference certificate overlapping at least a portion of the designated time range that includes the updated time value.

12. The method of claim 10, further comprising:

disabling transport layer security (TLS) verification with regard to a communication protocol;

establishing a connection between the Internet-of-things device and an unsecured service endpoint in the security service based at least on the TLS verification being disabled; and determining the updated time value based at least on the updated time value being indicated in information received by the Internet-of-things device from the unsecured service endpoint;

wherein the secure connection between the Internet-of-things device and the security service is established further by authenticating the security service to the Internet-of-things device based at least on a private key with which the information from the unsecured service endpoint is signed corresponding to a public key of the security service that is in possession of the Internet-of-things device.

13. The method of claim 10, further comprising:

determining the network time latency in accordance with a precision time protocol (PTP) technique by combining a first measurement of a first amount of time, which a first message takes to travel from the Internet-of-things device to a server via the network, and a second measurement of a second amount of time, which a second message takes to travel from the server to the Internet-of-things device via the network.

14. The method of claim 10, further comprising:

calculating a time of day by tracking passage of time with reference to the second updated time value using a real time clock (RTC) while the Internet-of-things device is powered off;

wherein the second timestamp is based at least on the time of day.

15. The method of claim 10, further comprising:

identifying a synchronized time value that is synchronized between the Internet-of-things device and a computing device in accordance with a network time protocol (NTP) technique; and providing a communication that indicates the synchronized time value to the computing device.

16. The method of claim 10, further comprising:

identifying a synchronized time value that is synchronized between the Internet-of-things device and a computing device in accordance with a network time protocol (NTP) technique; and providing a communication that indicates the synchronized time value to the computing device.

17. A computer program product comprising a computer-readable storage medium having instructions recorded thereon for enabling a processor-based system to perform actions, the actions comprising:

booting up the processor-based system by setting a time value associated with an internal clock of the processor-based system to a default time value;

resetting the time value associated with the internal clock of the processor-based system from the default time value to an updated time value, which is received from a trusted time source;

establishing a secure connection between the processor-based system and a security service by authenticating the processor-based system to the security service based at least on the updated time value being included in a designated time range indicated by a service-granted certificate that is granted by the security service;

receiving a first timestamp from the security service via the secure connection;

resetting the time value associated with the internal clock of the processor-based system from the updated time value to a second updated time value that is based at least on the first timestamp received from the security service;

combining the second updated time value and a network time latency associated with a network, which is used for communication between the processor-based system and the security service, to provide a corrected time value;

resetting the time value associated with the internal clock of the processor-based system from the second updated time value to the corrected time value; and performing an operation that utilizes a second timestamp, which is based at least on the second corrected time value.

18. The computer program product of claim 17, wherein the actions comprise:

authenticating the processor-based system to the security service based at least on a second time range indicated by a reference certificate, which is stored in a trusted key store (TKS) of the processor-based system, overlapping at least a portion of the designated time range that includes the updated time value.

19. The computer program product of claim 17, wherein the actions further comprise:

determining the network time latency in accordance with a precision time protocol (PTP) technique by combining a first measurement of a first amount of time, which a first message takes to travel from the processor-based system to a server via the network, and a second measurement of a second amount of time, which a second message takes to travel from the server to the processor-based system via the network.

20. The computer program product of claim 17, wherein the actions further comprise:

identifying a synchronized time value that is synchronized between the processor-based system and a computing device in accordance with a network time protocol (NTP) technique; and providing a communication that indicates the synchronized time value to the computing device.

* * * * *